(12) United States Patent
Van Oossanen

(10) Patent No.: US 9,862,458 B2
(45) Date of Patent: Jan. 9, 2018

(54) VESSEL COMPRISING AN AFT FOIL ORIENTED TO PROVIDE A FORWARDLY DIRECTED COMPONENT OF LIFT FORCE

(71) Applicant: Van Oossanen & Associates B.V., Wageningen (NL)

(72) Inventor: Pieter Van Oossanen, Wageningen (NL)

(73) Assignee: Van Oossanen & Associates B.V., Wageningen (NL)

( * ) Notice: Subject to any disclaimer, the term of this patent is extended or adjusted under 35 U.S.C. 154(b) by 0 days.

(21) Appl. No.: 15/325,977

(22) PCT Filed: Jul. 13, 2015

(86) PCT No.: PCT/NL2015/050510
§ 371 (c)(1),
(2) Date: Jan. 12, 2017

(87) PCT Pub. No.: WO2016/010423
PCT Pub. Date: Jan. 21, 2016

(65) Prior Publication Data
US 2017/0197687 A1 Jul. 13, 2017

(30) Foreign Application Priority Data
Jul. 14, 2014 (NL) ...................................... 2013178

(51) Int. Cl.
*B63B 1/24* (2006.01)
*B63B 1/08* (2006.01)
(Continued)

(52) U.S. Cl.
CPC ............... *B63B 1/248* (2013.01); *B63B 1/08* (2013.01); *B63B 1/242* (2013.01); *B63B 1/26* (2013.01); *B63B 1/34* (2013.01); *B63B 39/062* (2013.01)

(58) Field of Classification Search
CPC .......... B63B 1/248; B63B 1/08; B63B 1/242; B63B 1/26; B63B 1/34; B63B 39/062
See application file for complete search history.

(56) References Cited

U.S. PATENT DOCUMENTS

| 4,896,621 | A | * | 1/1990 | Coles | ..................... | B63B 1/248 |
| | | | | | | 114/274 |
| 5,311,832 | A | * | 5/1994 | Payne | ...................... | B63B 1/28 |
| | | | | | | 114/274 |

(Continued)

FOREIGN PATENT DOCUMENTS

| EP | 0 290 170 A2 | 11/1998 |
| FR | 699943 | 2/1931 |

(Continued)

OTHER PUBLICATIONS

Eirik Bockmann et al., "The Effect of a Fixed Foil on Ship Propulsion and Motions," Third International Symposium on Marine Propulsors smp' 13, May 2013, pp. 553-561.

(Continued)

*Primary Examiner* — Stephen P Avila
(74) *Attorney, Agent, or Firm* — Nixon Peabody LLP

(57) ABSTRACT

The invention relates to a vessel for operating on a body of water comprising: a non-planing hull having a waterline and a longitudinal direction with a forward portion, an aft portion, and a central portion, the hull being configured to have the aft portion with a smaller water displacement relative to a water displacement at the central portion; and an aft foil affixed to the aft hull portion with one or more connecting members, and below the surface of the water, and spaced from the hull, the aft foil having a span, a chord, and a leading edge and a trailing edge relative to a forward direction, wherein the leading edge of the aft foil is tilted at a downward angle relative to the horizontal, wherein the aft foil has a chord and profile in longitudinal cross section, with a configuration to provide a lifting force, the tilt angle of the chord of the aft foil being measured with respect to the horizontal, and wherein the aft foil is oriented to provide a continuous, upward, forwardly directed component of the lifting force.

20 Claims, 5 Drawing Sheets

(51) Int. Cl.
*B63B 1/34* (2006.01)
*B63B 39/06* (2006.01)
*B63B 1/26* (2006.01)

(56) References Cited

U.S. PATENT DOCUMENTS 6,148,756 A * 11/2000 Pavlov ..................... B63B 1/24
114/275
2007/0017428 A1   1/2007 Van Oossanen

FOREIGN PATENT DOCUMENTS

WO    WO/1996/26104    8/1996
WO    WO 2004/020276 A1    3/2004

OTHER PUBLICATIONS

Hans Heynen: "Hull Vane bespaart tot 24% brandstof—Techniek," Schuttevaer, Jul. 7, 2012, 2 pages.

* cited by examiner

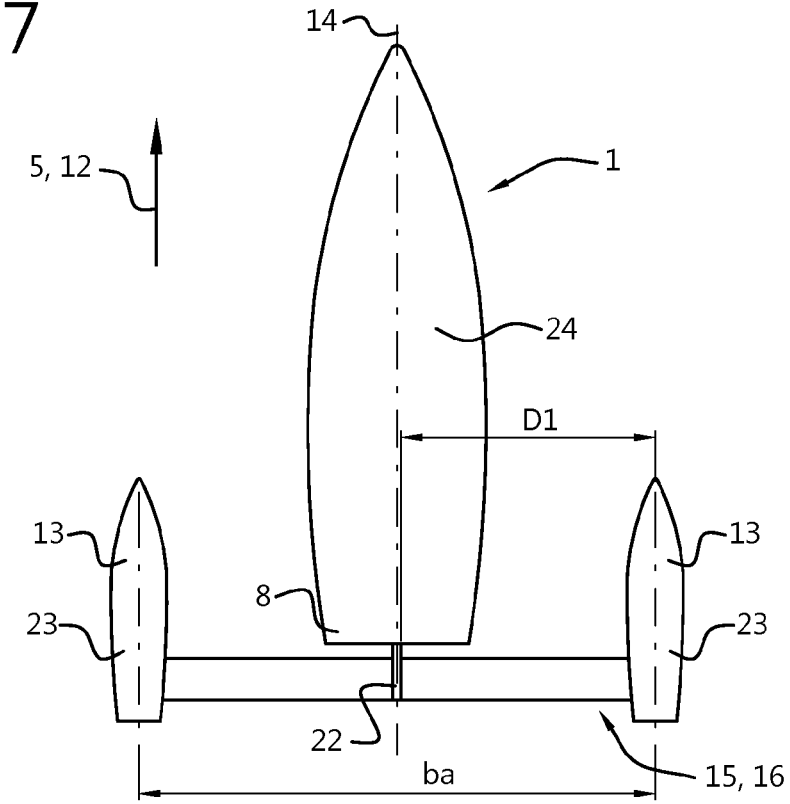
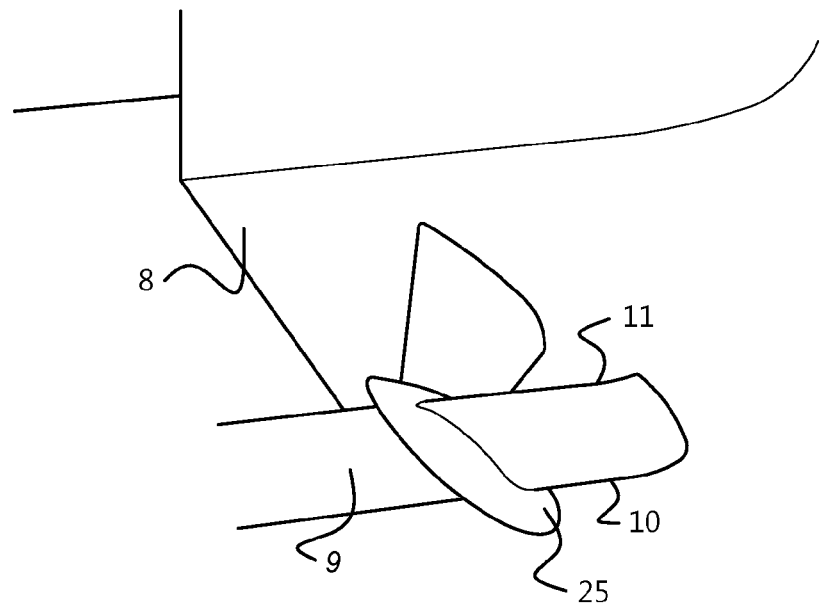

VESSEL COMPRISING AN AFT FOIL ORIENTED TO PROVIDE A FORWARDLY DIRECTED COMPONENT OF LIFT FORCE

CROSS-REFERENCE TO RELATED APPLICATION

This application is a national stage of Application No. PCT/NL2015/050510 filed Jul. 13, 2015, which claims priority from Netherlands Application No. 2013178 filed Jul. 14, 2014, which are both incorporated by reference in their entireties.

FIELD OF THE INVENTION

The present invention relates to a vessel comprising an aft foil, such as a sailing vessel or a motorized vessel.

BACKGROUND OF THE INVENTION

Such a vessel is known from the prior art, i.e. a vessel having an aft foil for influencing the trim condition of the vessel. This is especially important in higher speed ranges.

A disadvantage of the known vessel is that the aft foil adds to the total drag of the vessel or at least does not develop a forward-directed propulsion force.

It is an object of the present invention to provide a vessel with an aft foil, wherein the aft foil develops a forward-directed propulsion force.

SUMMARY OF THE INVENTION

Thereto, the vessel for operating on a body of water according to the invention comprises:

a non-planing hull having a waterline and a longitudinal direction with a forward portion, an aft portion, and a central portion, the hull being configured to have the aft portion with a smaller water displacement relative to a water displacement at the central portion; and an aft foil affixed to the aft hull portion with one or more connecting members, and below the surface of the water, and spaced from the hull, the aft foil having a span, a chord, and a leading edge and a trailing edge relative to a forward direction, wherein the leading edge of the aft foil is aligned with the horizontal or tilted at an upward or downward angle relative to the horizontal, wherein the aft foil has a chord and profile in longitudinal cross section, with a configuration to provide a lifting force, the tilt angle of the chord of the aft foil being measured with respect to the horizontal, and wherein the aft foil is oriented to provide a continuous, forward-directed component of the lift force.

The aforementioned angle ($\alpha$) preferably lies in the range of $-15°$ to $5°$, more preferably is around $-1$, $0$ or $1°$.

It should be noted that EP 0.290.170 A2 discloses a planing vessel wherein differential hydrodynamic mechanisms are at play, compared to a non-planing vessel as disclosed in the present patent application. The hull of the vessel disclosed in EP 0.290.170 A2 is lifted out of the water by the foils, as opposed to the subject-matter disclosed in the present patent application, wherein the hull stays submerged. Therefore, Applicant deems EP 0.290.170 A2 to have little relevance to the present invention.

Vessels comprising a non-planing hull and an aft foil oriented to provide a continuous, forward-directed component of the lift force are furthermore known from US 2007/017428 A1 and WO 2004/020276 A1 in the name of the present Applicant.

US 2002/0040673 A1 describes a vessel having a foil arranged at a relatively far aft and 'deep' position with respect to the hull—outside of the influence sphere of the hull. That requires the foil to possess camber or to be oriented with the leading edge upwards, with respect to the trailing edge, to develop lift. No forwards-directed force is then developed.

JP 11180379 describes a vessel wherein foils are arranged above the waterline when the vessel is stationary, instead of below the waterline. The foil disclosed in JP 11180379 is configured to guide the flow around the hull in such a way that the second foil is allowed to develop a lift force having an upward force component.

An embodiment relates to a vessel, wherein the aft foil is connected to the aft hull portion by means of a pair of connecting members, the aft foil in spanwise direction being symmetrical with respect to a vertical mirror plane, wherein each of the connecting members connect to the aft foil in a junction region at a spanwise distance from the mirror plane being 25 to 50%, preferably 30 to 50%, more preferably 40 to 50% of the span of the aft foil. By placing the connecting members at a more outward position, the inventor has found that the flow over the aft foil itself, in particular the flow over the upper surface of the aft foil, can be positively influenced, especially the part of the aft foil extending between the connecting members. Furthermore, from a construction point of view, placing the connecting members at a more outward position reduces the likelihood of flutter that may occur at the tips of the aft foil when unstable flow conditions occur there.

An embodiment relates to a vessel, wherein the connecting members are located at the extremities of the foil, at the foil tips. The positive influence thereof on the aft foil extending between the connecting members is most prevalent when the connecting members connect to the foil tips, i.e. to the most outward positions of the aft foil.

An embodiment relates to a vessel, wherein the connecting members have a leading edge sweep angle, in elevation view, of 0 to 40°, preferably 20 to 40°, more preferably 30 to 40°, with respect to the vertical. The inventor has found from experiments that the stated sweep angles reduce drag caused by the connecting members themselves considerably. Less leading edge sweep in practice appears to increase drag and cause the boundary layer around the connecting part of the foil to detach more quickly. More leading edge sweep makes it relatively difficult to provide the necessary structural strength to the connecting members. It should be noted that the leading edge sweep angle will increase, such as by 20°, in case the respective connecting member is tapered.

An embodiment relates to a vessel, wherein the connecting members each comprise a rounded shape in a transverse vertical plane such as to afford a gradual transition from the foil to the vertical in the junction region. The inventor has found from experiments that the drag caused by the combined arrangement of the aft foil and the connecting members is reduced by the rounded shape. At the same time, the aft foil in practice appears to benefit from a spill-over effect caused by the lift generated by the connecting members (even small amounts) amplifying the forward-directed component of the lift of the aft foil. Preferably, the rounded junction region is shaped by means of a milling process or comprises a milled body, since warping may be significant in the rounded region (due to the occurrence of a significant change in the angle of attack setting of the connecting member from a vertical part of the connecting member to another part thereof or the aft foil) and since other manufacturing techniques prove to be very tedious, inaccurate or very expensive in this regard. Additionally, in the junction region, the trailing edge of the aft foil may also be rounded (when seen in plan view).

An embodiment relates to a vessel, wherein the rounded shape in the junction region has a maximum inner bend radius of 1 times the chord length of the aft foil, and a minimum inner bend radius of 0.5 times the chord length of the aft foil. The inventor has found this dimensioning of the rounded shape to provide optimal results in connection with drag reduction. Larger bend radii would lessen the generation of the optimal lift force by the aft foil, whereas smaller radii would reduce the aforementioned spill-over effect of lift or worse, increase drag of the combined connecting member-aft foil arrangement.

Through experiments the inventor has found that the stern wave contains sufficient flow energy, and the required flow conditions, to generate a useful forward-directed lift component.

An embodiment relates to a vessel, wherein the connecting members possess a streamlined section shape with respect to the forward direction with a chord length of 0.8 to 1.2 times the chord length of the aft foil. Larger chord lengths cause increased drag, while smaller chord lengths are often not possible from a strength point of view. Preferably, when seen in elevation view, the leading edge of the connecting member intersects the aft foil at a location aft of the leading edge of the aft foil, by as much as 20 to 40%, more preferably by 30 to 40%, of the aft foil's chord length.

An embodiment relates to a vessel, wherein the chord length of the connecting members taper from a first chord length at a junction with the hull to a relatively smaller

TABLE 1

| Case description | Vs | Rv | Rp | R | Rt | Rise | Trim | Sw(dyn) |
| | | | | Units | | | | |
| | knots | kN | kN | kN | kN | m | deg | m² |
| Bare hull | 16.0 | 34.786 | 88.123 | 122.909 | 126.74 | −0.245 | −0.026 | 552 |
| Bare hull with U shape Hull Vane detached | 16.0 | 36.071 | 59.539 | 95.61 | 99.412 | −0.213 | 0.568 | 547 |
| Bare hull with conventional Hull Vane setup | 16.0 | 35.97 | 62.411 | 98.381 | 102.179 | −0.213 | 0.56 | 547 |
| Bare hull with U shaped Hull Vane, smaller chord | 16.0 | 35.957 | 60.304 | 96.262 | 100.065 | −0.216 | 0.531 | 548 |
| Bare hull with conventional Hull Vane | 16.0 | 35.767 | 61.068 | 96.835 | 100.637 | −0.208 | 0.567 | 548 |
| Bare hull conventional Hull Vane and struts | 16.0 | 36.061 | 62.289 | 98.35 | 102.152 | −0.21 | 0.563 | 548 |
| Bare hull with Conventional Hull Vane and Nacelle | 16.0 | 36.102 | 62.345 | 98.447 | 102.245 | −0.212 | 0.564 | 547 |

Table 1 shows the total resistance Rt of the hull for various configurations, as obtained from CFD experiments. The aforementioned embodiment with the rounded shape in the junction region is indicated as 'Bare hull with U shape Hull Vane detached'. It can be clearly seen that Rt—surprisingly so—is significantly lower than the configuration with a bare hull, or even the prior art configurations with a conventional 'hull vane', as disclosed in US 2007/017428 A1 and WO 2004/020276 A1. As stated before, Applicant submits that a spill-over effect caused by the lift generated by the connecting members may be present amplifying the forward-directed component of the lift of the aft foil. Having such a rounded shape in the junction region is certainly not hinted at in US 2007/017428 A1 or WO 2004/020276 A1, nor is it recognized in these publications that even further, significant drag reductions can be obtained by using the above-described rounded shapes, let alone by using the stated bend radii.

An embodiment relates to a vessel, wherein a sweep angle, in plan view, of (the leading edge of) the aft foil is 15 to 25°, more preferably 5 to 15°, even more preferably 0 to 5°. Especially at higher speeds, a moderate sweep angle in practice reduces drag. However, the inventor has found that when the aft foil is placed relatively close to the aft/stern of the vessel or at a position where hull displacement decreases relatively rapidly towards the stern of the vessel, an increasingly smaller sweep angle or even a slight forward sweep angle may be beneficial.

An embodiment relates to a vessel, wherein at least half the chord of the aft foil is behind a vertical line through the location where the aft portion of the hull leaves the water.

second chord length at the junction with the aft foil, the taper ratio being 0.5 to 0.9, preferably 0.5 to 0.7, more preferably around 0.5. Interference drag caused by cross-over flow from the connecting members in the junction region is found to be relatively minimal for these values, in particular at higher speeds.

An embodiment relates to a vessel, wherein the chord length of the aft foil tapers from a first chord length at the mirror plane to a relatively smaller second chord length at a foil tip, the taper ratio being 0.5 to 1.0, preferably 0.7 to 0.9, more preferably around 0.8. The above taper ratios lead to relatively high lift to drag ratio values.

An embodiment relates to a vessel, wherein, during use, in the longitudinal direction the central portion of the hull displays a pressure transition region, wherein the pressure force on the hull changes from increasing drag forward of this region, to reducing drag aft of this region, wherein a forward foil is positioned in front of this pressure transition region. The inventor has found during extensive experimentation that a phenomenon dubbed (for now) 'pressure reflection' occurs, i.e. whereby the low pressure on the upper side of the forward foil is continued on the hull above. Thereto, the forward foil is preferably arranged at a distance not greater than one chord length from the hull at the respective hull position. From the aforementioned experiments it appears that this phenomenon leads to a lower hull drag if the forward foil is arranged at a position where the hull benefits from a low pressure (forward of the pressure transition region) and to a higher hull drag if the forward foil is arranged at a position where the hull benefits from a high pressure (aft of the pressure transition region). Therefore, the forward foil is to be positioned forward of this pressure transition region. For the same reason the aft foil is to be positioned aft of the pressure transition region and preferably at least partly behind the submerged part of the hull to avoid the increase in drag caused by pressure reflection. It should be noted that 'pressure transition region' relates to the region where the horizontal component of the pressure force on the hull changes sign—from being a force opposing forward motion forward of this region, to a force assisting forward motion aft of this region, and not to the transition of the flow around the hull from laminar flow to turbulent flow or the like, as the skilled person will understand.

The forward foil is advantageously used to bring the longitudinal trim of the vessel back to a horizontal orientation at higher vessel speeds when the aft foil develops high lift values. The skilled person should be aware that the forward foil is not intended to be used to obtain a hydrofoil vessel wherein forward and aft foils are used to lift the hull above the water at high speeds, such as the planing vessel disclosed in EP 0.290.170 A2. Furthermore, the above features, are not known from, nor hinted at by, US 2007/017428 A1. It should also be noted that the vessel and foil disclosed in the paper "The Effect of a Fixed Foil on Ship Propulsion and Motions" by Eirik Bockmann and Sverre Steen and as presented at the "Third International Symposium on Marine Propulsors" in May 2013, in Launceston, Tasmania, Australia, are basically unrelated.

Preferably, the aft and forward foils (and in particular the forward foil) are configured to keep at least 30% to 90%, more preferably 50% to 70%, of the submerged volume of the vessel below the waterline. The inventor has found from experiments that these displacement values allow for the development of a greater (forward-directed) component of the lift force by the aft foil, without the vessel adopting a bow-down trim condition. The vessel's longitudinal stability is thereby also not compromised. Therein, the forward foil may also utilize the 'pressure reflection' phenomenon to decrease the drag of the forward hull portion.

An embodiment relates to a vessel, wherein the forward foil in spanwise direction is symmetrical with respect to the vertical mirror plane, wherein the forward foil has a dihedral angle, such that the distance of the foil from the hull remains substantially the same along the span of the foil. The inventor has found that by doing so the 'pressure reflection' phenomenon is optimally taken advantage of.

An embodiment relates to a vessel, wherein the dihedral angle is 5 to 50°, preferably 10 to 30°, more preferably around 20° depending on the local form of the hull of the vessel. These values were found to optimize the 'pressure reflection' phenomenon, without compromising the transverse stability of the vessel.

An embodiment relates to a vessel, wherein an aspect ratio of the forward foil is at least 4.0, preferably in excess of 5.0. The inventor has found that otherwise the induced drag of the forward foil may become too high.

An embodiment relates to a vessel, wherein an aspect ratio of the aft foil is approximately 4.0 to 7.0, preferably in excess of 5.0. It was found that for lower aspect ratios, the aft foil starts to suffer from a relatively high induced drag.

An embodiment relates to a vessel, wherein the span of both the forward and aft foil is at most 90% of a vessel's hull width at the longitudinal position of the respective foil. A higher foil span in practice proves to be impractical.

An embodiment relates to a vessel, wherein the forward foil is tilted at a tilting angle ($\varphi$) with the leading edge upwards 0 to 10° with respect to the horizontal. At these tilt angles, the generation of useful forward foil lift appears to be optimal.

An embodiment relates to a vessel, wherein the connecting members comprise a foil with a chord, and a leading edge and a trailing edge relative to a forward direction, wherein the connecting member foil has a chord and profile in longitudinal cross section, with a configuration to provide a lifting force, and wherein the connecting member foil is oriented to provide a continuous, sideways and forward-directed component of the lifting force to amplify the forward-directed component of the lift generated by the aft foil.

The inventor has found that by giving the connecting member a configuration to provide a forward-directed component of the lifting force, e.g. by turning the (chord of the) connecting member foil inwards or outwards (depending on the local flow direction) or for instance by giving the connecting member foil camber, the connecting member foil starts to contribute to the forward-directed lift generation of the main foil/connecting member arrangement. The inventor attributes this due to the flow below the aft portion of the vessel being directed slightly inwards and due to the flow below the forward portion of the vessel being directed slightly outwards. The protection conferred by the appended set of claims is not to depend on the validity of this theory, however.

An embodiment relates to a vessel, wherein an angle between the chord of the connecting member foil, and the vertical mirror plane is between 0 to 10°, such as around 5° in the case of the aft foil, and between 0 to −10°, such as around −5°, in the case of the forward foil. These values prove to be optimal to benefit from the inward- and outward-directed flow below the aft- and forward portion of the vessel respectively, at the tip of the foil, such that a significant sideways- and forward-directed component of the lift force is created which increases the forward-directed component of the lift generated by the main foil. From experiments it was found that an additional forward-directed component of the lift force of 5 to 10% can be obtained, relative to the forward-directed component of the lift on the aft and forward foil alone with 'conventionally' designed/oriented connecting members.

In an embodiment, the connecting members are each connected to the aft foil by means of a nacelle, preferably at a connection point at a spanwise distance from the mirror plane of 30 to 40% of the span of the aft foil. The nacelle is shaped in such a way that, when viewed in the flow direction, a smooth change in cross-sectional area of the combined aft foil/connecting members/nacelle arrangement is provided (as encountered by the flow). To this end, a forward part of the nacelle may have a conical or rounded shape. Preferably, the nacelle has a bullet-like shape. The inventor has found that, in particular when the connecting members have a leading edge sweep, it is important for the forward part of the nacelle to protrude forwards with respect to the leading edge of the aft foil (and the leading edge of the respective connecting member) at the connection point as to obtain a gradual increase in cross-sectional area. By providing the connection point at 30 to 40% of the span of the aft foil an optimal balance is achieved between structural requirements on the one hand and hydrodynamic (drag) considerations on the other hand.

An embodiment relates to a vessel, wherein the forward foil is connected to the central or forward hull portion in front of the pressure transition region by means of one or more, such as a pair, of connecting members, the connecting members being defined with respect to the forward foil and the forward hull portion, mutatis mutandis, by means of the connecting member-related features as described with respect to the aft foil at the aft portion of the vessel.

BRIEF DESCRIPTION OF THE DRAWINGS

Embodiments of a vessel according to the invention will by way of non-limiting example be described in detail with reference to the accompanying drawings. In the drawings:

FIG. 7 shows a schematic bottom view of a fourth exemplary embodiment of the vessel; and FIG. 8 shows a detailed perspective view of another exemplary embodiment of the aft foil of FIG. 4.

DETAILED DESCRIPTION OF THE INVENTION

Figure 1:
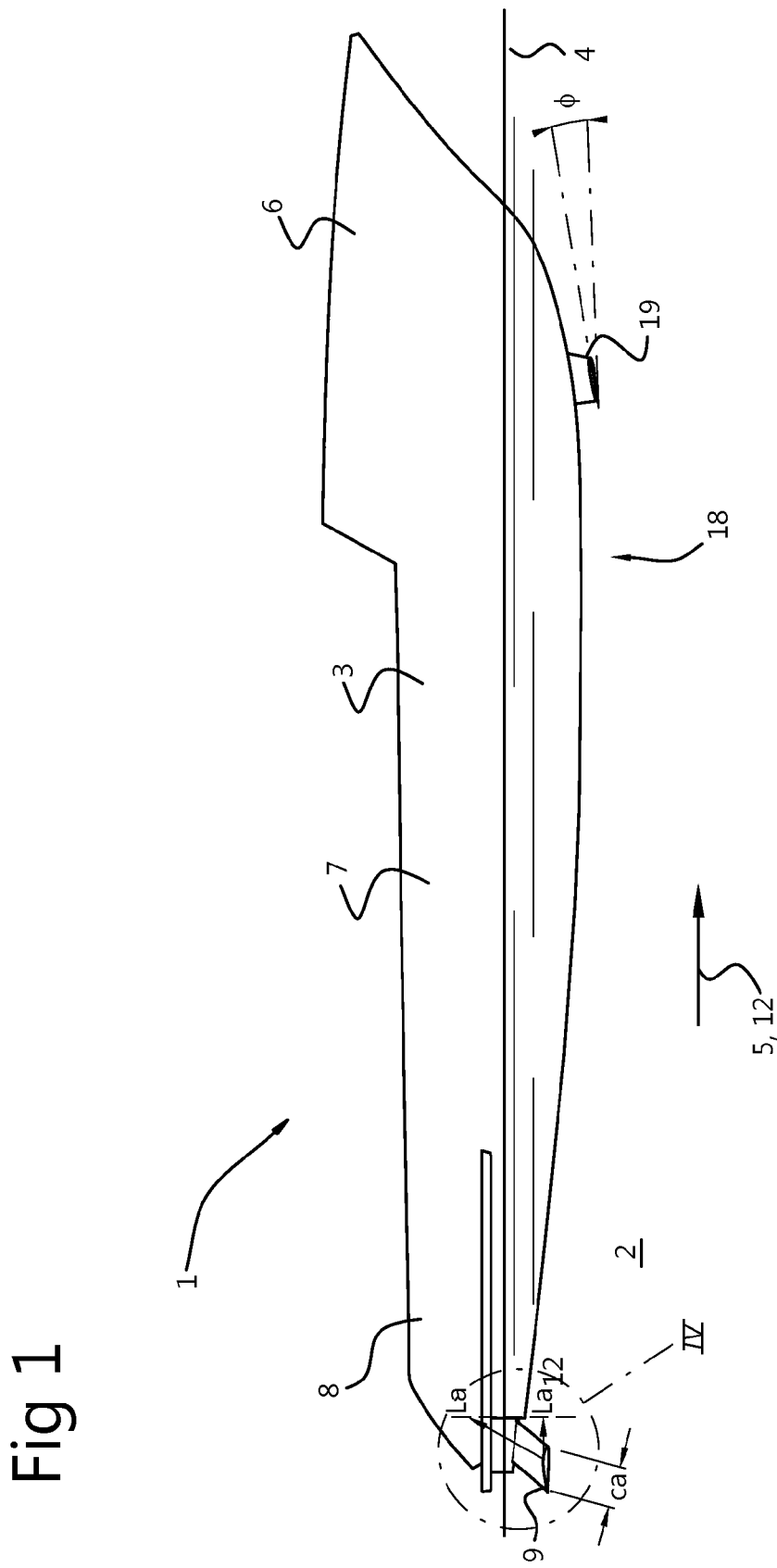
FIG. 1 shows a schematic elevation view of a first exemplary embodiment of a vessel according to the invention.
Figure 2:
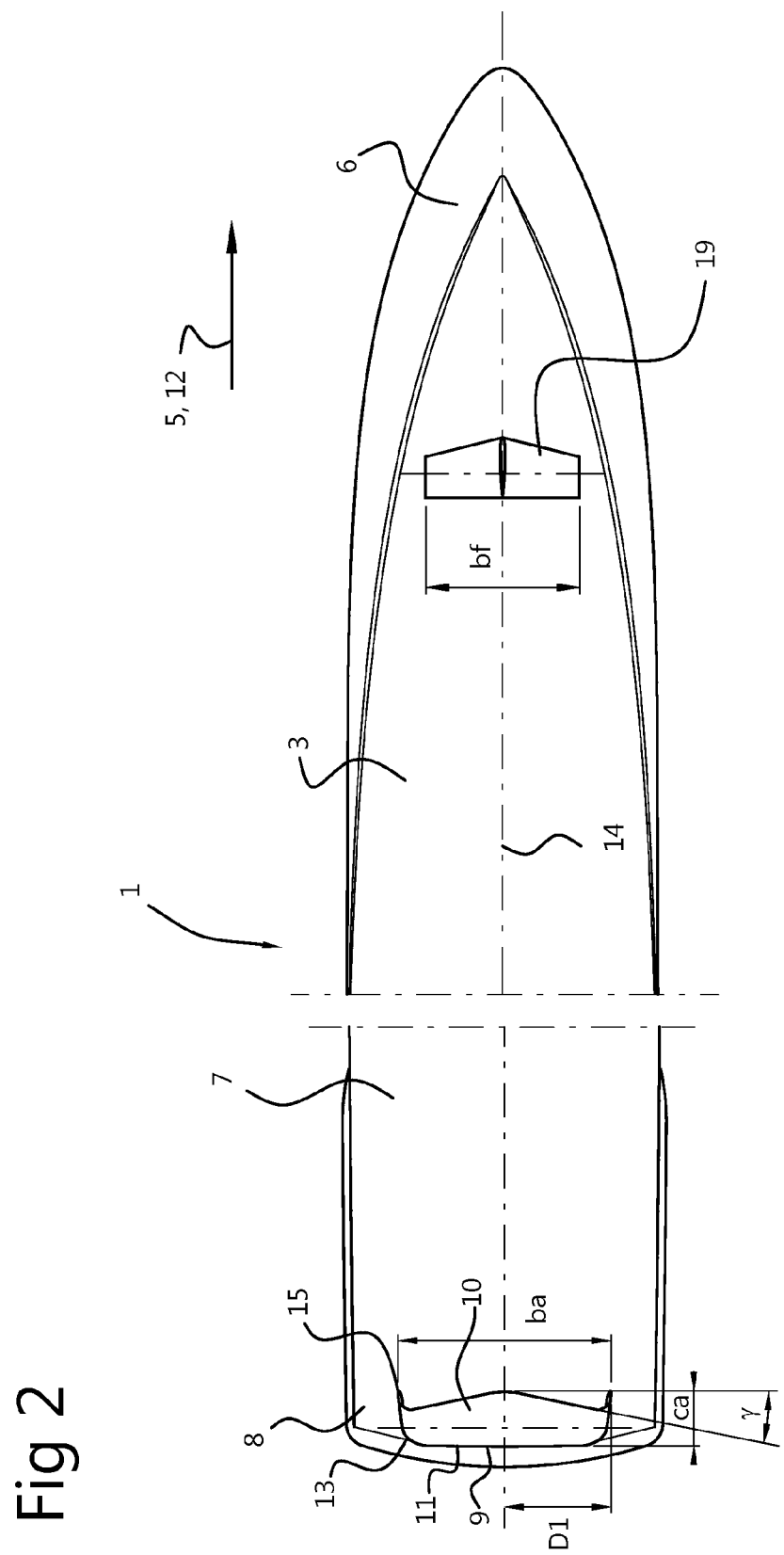
FIG. 2 shows a schematic plan view of the first exemplary embodiment of the vessel of FIG. 1.
Figure 3:
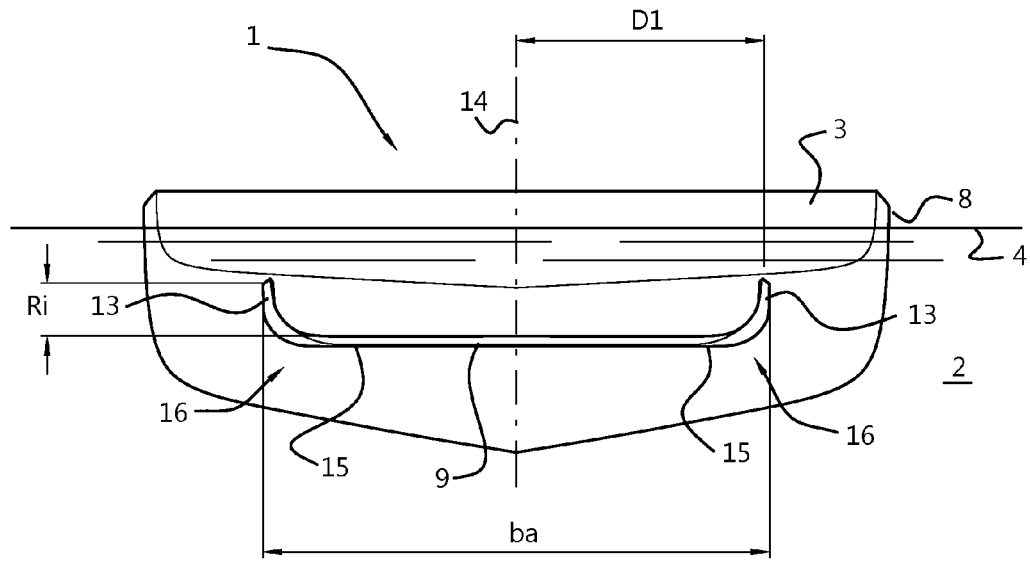
FIG. 3 shows a rear view of the first exemplary embodiment of the vessel of FIGS. 1 and 2.

FIGS. 1-3 respectively show a schematic elevation view, plan view and rear view of a first exemplary embodiment of a vessel 1 according to the invention.

A vessel 1 is shown for operating on a body of water 2 comprising a non-planing hull 3, such as a sailing vessel or a motorized vessel. A waterline 4 is shown as the delimitation between the water body 2 and the air above. A longitudinal direction is indicated by reference numeral 5. The hull 3 comprises a forward portion 6, an aft portion 8 and a central portion 7. The hull 3 is configured to have the aft portion 8 with a smaller water displacement relative to a water displacement at the central portion 7. An aft foil 9 is affixed to the aft hull portion 8, situated below the surface of the water, and spaced from the hull 3. The aft foil 9 has a span (ba, see FIG. 2), a chord (ca), and a leading edge 10 and a trailing edge 11 relative to a forward direction 12 (see FIGS. 2 and 3). The leading edge 10 of the aft foil 9 is tilted at a downward angle α relative to the horizontal (see FIG. 4). The aft foil 9 has a chord and profile in elevation view, with a configuration to provide a lifting force La, the tilt angle of the chord of the aft foil being measured with respect to the horizontal. Therein, the aft foil 9 is oriented to provide a continuous, upward, forwardly-directed component of the lifting force, La12.

The chord length (ca) of the aft foil 9 may taper from a first chord length at a vertical mirror plane 14 to a relatively smaller second chord length at a foil tip 15 (see FIG. 2), the taper ratio being 0.5 to 1.0, preferably 0.7 to 0.9, more preferably around 0.8.

As indicated in FIG. 1, in the longitudinal direction 12 the central hull portion 7 comprises a pressure transition region 18, wherein the pressure force on the hull 3 changes from increasing drag forward of this region, to decreasing drag aft of this region. A forward foil 19 is to be positioned in front of the pressure transition region 18. Analogously, the aft foil 9 is to be positioned aft of the pressure transition region 18, preferably at least partly aft of where the submerged part of the hull ends.

Preferably, the aft and forward foils 9, 19 are configured to develop lift to keep at least 30 to 60% of the submerged volume of the vessel 1, when stationary, below the waterline 4, as the inventor does not seek to lift the hull 1 completely from the water.

A tilting angle φ of the forward foil 19, as indicated in FIG. 1, may be 0 to 10° with respect to the horizontal. As shown in FIG. 2, a leading edge sweep angle γ of the aft foil 9 with respect to the mirror plane 14 may be −15 to 25°, more preferably −5 to 15°, even more preferably 0 to 5°.

FIG. 3 shows a rear view of the first exemplary embodiment of the vessel of FIGS. 1 and 2. The aft foil 9 is connected to the aft hull portion 8 by means of a pair of connecting members 13. The aft foil 9 is symmetrical with respect to a vertical mirror plane 14 in spanwise direction. Each of the connecting members 13 connect to the aft foil 9 at a spanwise distance D1 from the mirror plane 14 being 25 to 50%, preferably 30 to 50%, more preferably 40 to 50% of the span (ba) of the aft foil 9. Most preferably, the connecting members 13 of the aft foil 9 are connected to the foil tips 15, at 50% of the span (ba) from the mirror plane 14.

As shown in FIG. 3, the connecting members 13 each connect to the foil tip 15 in a junction region 16. The junction region 16 may have a rounded shape in a vertical transverse plane so as to provide a smooth transition between each connecting member 13 and the aft foil 9. The rounded shape in the junction region preferably has a maximum inner bend radius Ri of 1 times the chord length (ca) of the aft foil 9, and a minimum inner bend radius of 0.5 times the chord length (ca) of the aft foil 9. Additionally, when seen in plan view, the trailing edge 11 of the aft foil may be rounded in the junction region 16.

Figure 4:
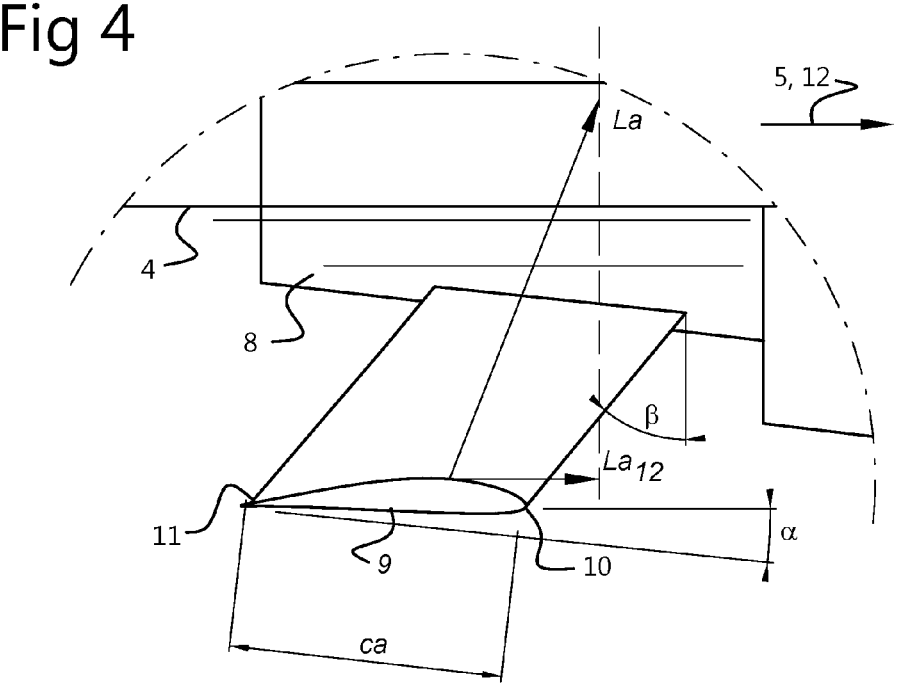
FIG. 4 shows a detailed elevation view of the aft foil of the first exemplary embodiment of FIGS. 1 and 2.

FIG. 4 shows a detailed elevation view of the aft foil 9 of the first exemplary embodiment of FIGS. 1 and 2. As shown, the connecting members 13 may have a leading edge sweep angle β of 0 to 40°, preferably 20 to 40°, more preferably 30° to 40° with respect to the vertical. Analogously, the trailing edge of the connecting members 13 may also be provided with a sweep angle, preferably with a smaller sweep angle than at the leading edge. In case of taper, β may increase by 20°, such as to 20 to 60°.

The chord length (cc) of the connecting members 13 may taper from a first chord length at the intersection with the hull of the connecting members 13 at the aft hull portion 8 to a relatively smaller second chord length at a position where the connecting members 13 connect to the aft foil 9, the taper ratio being 0.5-0.9, preferably 0.5-0.7, more preferably around 0.5.

Figure 5:
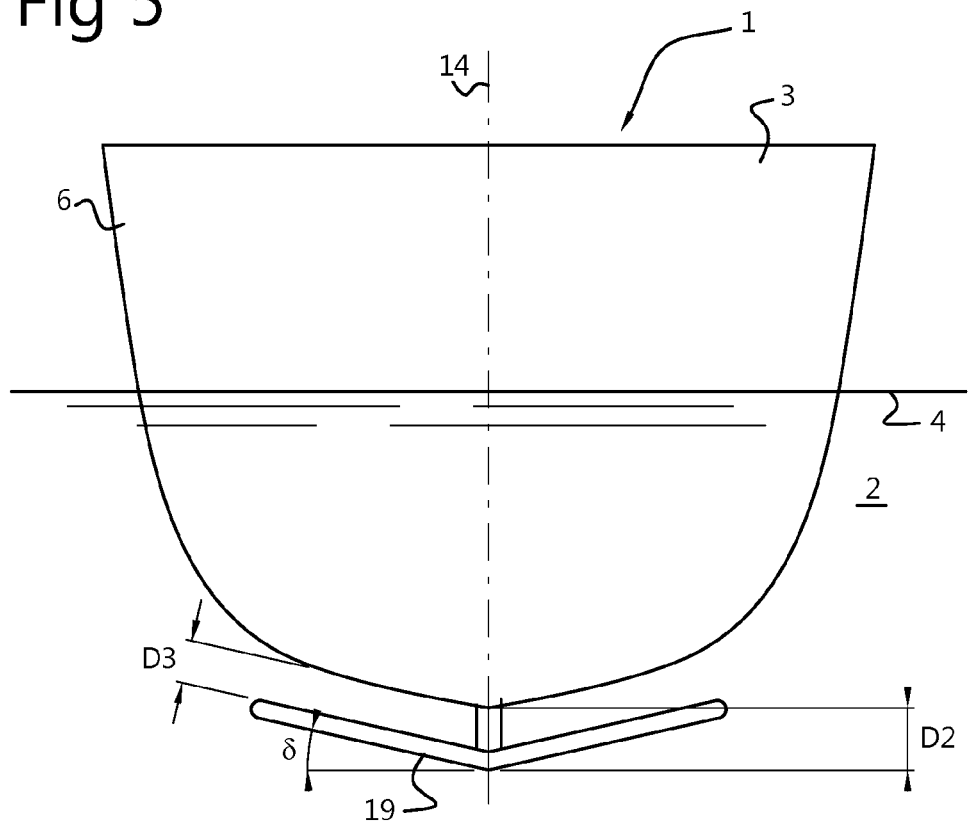
FIG. 5 shows a front view of the forward foil of a second exemplary embodiment of the vessel.

As stated, FIG. 5 shows a front view of the forward foil 19 of a second exemplary embodiment of the vessel 1. The forward foil 19 in spanwise direction is symmetrical with respect to the vertical mirror plane 14. The forward foil 19 preferably has a dihedral angle ∂, i.e. an upward angle with respect to the horizontal plane. The distance D2 from the hull 3 at a position in the mirror plane 14 and the dihedral angle ∂ are to be so chosen that in spanwise direction of the forward foil 19 a substantially constant distance D3 from the hull 3 is maintained. The dihedral angle may be 5 to 50°, preferably 10 to 30°, more preferably around 20°. An aspect ratio of the forward foil 19 may be at least 5.0, whereas an aspect ratio of the aft foil 9 may be approximately 4.0-7.0, such as around 5.0. The span (bf) of the forward foil 19 is preferably at most 90% of a vessel's hull width at a longitudinal position of the forward foil 19.

Figure 6:
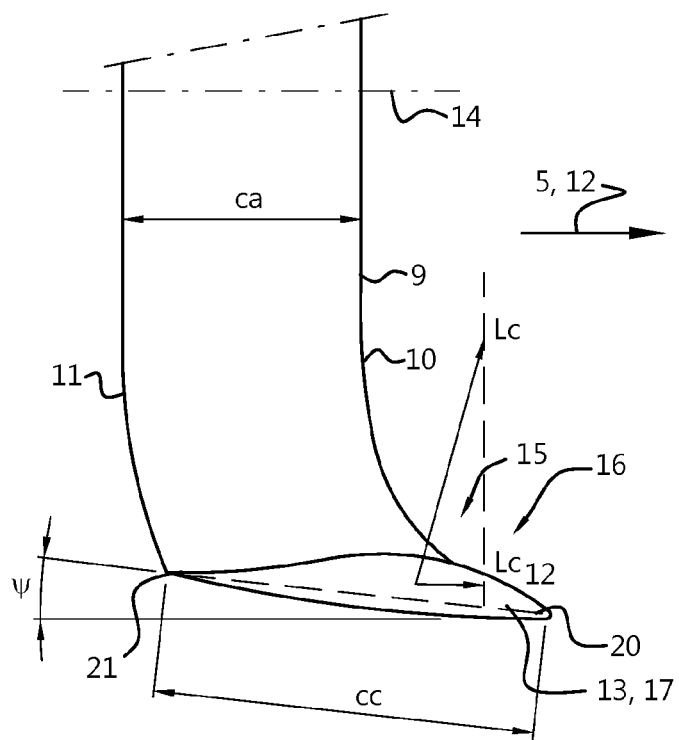
FIG. 6 shows a detailed plan view of the connecting member of a third exemplary embodiment of the vessel.

FIG. 6 shows a detailed plan view of the connecting member 13 of a third exemplary embodiment of the vessel 1. The connecting members 13 therein have a connecting member foil 17 with a chord (cc), a leading edge 20 and a trailing edge 21 relative to the forward direction 12. The connecting member foil 17 has a chord (cc) and profile, with a configuration to provide a lifting force (Lc). More specifically, the connecting member foil 17 is oriented to provide a continuous, sideways, and forward-directed component of the lifting force Lc12 to amplify the forward lift component La12 generated by the aft foil 9. The connecting members 13 may each have a connecting member foil 17 having a streamlined profile with respect to the forward direction 5 with a chord having a chord length of 0.8 to 1.2 times the chord length of the aft foil. Thereto, an angle ψ between the chord (cc) of the connecting member foil 17, and the vertical mirror plane may be around 0 to 10°, such as around 5°.

Although not explicitly shown in the figures, the forward foil 19 may be connected to the central or forward hull portion in front of the pressure transition region 18 by means of a single or a pair of forward connecting members. The forward connecting members may be defined with respect to the forward foil 19 and/or the central or forward portion 7, 6, and/or the vertical mirror plane 14, and/or the vertical/horizontal, mutatis mutandis, by means of the connecting member-related features as described with respect to the aft foil 9.

FIG. 7 shows a schematic bottom view of a fourth exemplary embodiment of the vessel 1. As shown, at least half the chord of the aft foil 9 may be behind a vertical line through the location where the aft portion 8 of the hull leaves the water. This also holds for the embodiments described in FIGS. 1 to 6. As shown, the connecting members 13 may therein be formed as outriggers 23, spaced substantially apart from a central hull 24. The central hull 24 and the two outriggers 23 are rigidly connected above the waterline, however, for instance forming a single hull. The outriggers 23 are to be spaced at a substantial spanwise distance D1 from the vertical mirror plane 14. The spanwise distance D1 therein is substantially larger than half the hull width of the aft portion/stern 8, such as 1.5-2.5 times, for instance 2 times. An additional strut 22 may be arranged at the position of the vertical mirror plane 14 to connect the aft foil 9 to the central hull 24.

It should be noted that, also with the other embodiments, an additional strut or, in general, an additional (intermediate) connecting member may be added (for instance at the position of the vertical mirror plane) to improve construction strength, for instance in case the aft foil has a relatively large span.

FIG. 8 shows a detailed perspective view of another exemplary embodiment of the aft foil/connecting member arrangement of FIG. 4. In FIG. 8, the connecting members 13 are each connected to the aft foil 9 by means of a nacelle 25, preferably at a connection point at a spanwise distance from the mirror plane of 30 to 40% of the span of the aft foil 9. The nacelle 25 is shaped in such a way that, when viewed in the flow direction, a smooth change in cross-sectional area of the combined aft foil/connecting members/nacelle arrangement is provided (as encountered by the flow). To this end, a forward part of the nacelle 25 may have a conical or rounded shape. Preferably, the nacelle has a bullet-like shape. The inventor has found that, in particular when the connecting members 13 have a leading edge sweep, it is important for the forward part of the nacelle 25 to protrude forwards with respect to the leading edge 10 of the aft foil 9 (and the leading edge of the respective connecting member) at the connection point as to obtain a gradual increase in cross-sectional area. By providing the connection point at 30 to 40% of the span of the aft foil 9 an optimal balance is achieved between structural requirements on the one hand and hydrodynamic (drag) considerations on the other hand.

Thus, the invention has been described by reference to the embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention.

LIST OF REFERENCE NUMERALS

1. Vessel
2. Body of water
3. Non-planing hull
4. Waterline
5. Longitudinal direction
6. Forward portion
7. Central portion
8. Aft portion
9. Aft foil
10. Aft foil leading edge
11. Aft foil trailing edge
12. Forward direction
13. Aft foil connecting member
14. Vertical mirror plane
15. Foil tip
16. Junction region aft foil/connecting member
17. Connecting member foil
18. Pressure transition region
19. Forward foil
20. Leading edge of connecting member foil
21. Trailing edge of connecting member foil
22. Further connecting member/strut
23. Outrigger
24. Central hull
25. Nacelle
La=lift force of aft foil
La12=forwardly oriented lift force of aft foil
Lc=lift force of connecting member
Lc12=forward oriented lift force of connecting member
ba=span of aft foil
bf=span of forward foil
ca=chord of aft foil
cc=chord of connecting member
D1=spanwise distance from the mirror plane
D2=distance from hull at position in mirror plane to forward foil
D3=distance of forward foil to hull in spanwise direction
α=tilting angle of aft foil
β=leading edge sweep angle of connecting member
γ=leading edge sweep angle of aft foil
∂=dihedral angle of forward foil
Φ=tilting angle of forward foil
Ψ=angle between the chord of the connecting member foil, and the vertical mirror plane
Ri=inner bend radius

The invention claimed is:
1. Vessel (1) for operating on a body of water (2) comprising:
a non-planing hull (3) having a waterline (4) and a longitudinal direction (5) with a forward portion (6), an aft portion (8), and a central portion (7), the hull being configured to have the aft portion with a smaller water displacement relative to a water displacement at the central portion; and an aft foil (9) affixed to the aft hull portion with one or more connecting members (13), and below the surface of the water, and spaced from the hull, the aft foil having a span (ba), a chord (ca), and a leading edge (10) and a trailing edge (11) relative to a forward direction (12), wherein the leading edge of the aft foil is aligned with the horizontal or tilted at an upward or downward angle (α) relative to the horizontal, wherein the aft foil has a chord and profile in longitudinal cross section, with a configuration to provide a lifting force (La), the tilt angle of the chord of the aft foil being measured with respect to the horizontal, and wherein the aft foil is oriented to provide a continuous, upward, forwardly directed component (La12) of the lifting force (La), wherein, during use, in the longitudinal direction the central portion of the hull displays a pressure transition region (18), wherein the pressure force on the hull changes from increasing drag forward of this region, to reducing drag aft of this region, characterized in that a forward foil (19) is positioned in front of the pressure transition region and the aft foil is positioned aft of the pressure transition region, the forward foil being arranged at a distance not greater than one chord length from the hull, whereby the low pressure on the upper side of the forward foil is continued on the hull above, wherein the aft and forward foils are configured to keep at least 50% to 70% of the submerged volume of the vessel, when stationary, below the waterline, the forward foil preventing the vessel to adopt a bow-down trim condition.

2. The vessel (1) according to claim 1, wherein the aft foil is connected to the aft hull portion by means of a pair of connecting members (13), the aft foil in spanwise direction being symmetrical with respect to a vertical mirror plane (14), wherein each of the connecting members connect to the aft foil in a junction region (16) at a spanwise distance (D1) from the mirror plane being 25 to 50%, of the span of the aft foil.

3. The vessel (1) according to claim 2, wherein the aft foil has foil tips (15) and each of the connecting members is located at a respective foil tip.

4. The vessel (1) according to claim 3, wherein the connecting members have a leading edge sweep angle (β) of 0 to 40° with respect to the vertical.

5. The vessel (1) according to claim 3, wherein the connecting members each comprise a rounded shape in a transverse vertical plane such as to afford a gradual transition from the aft foil to the vertical in the junction region (16).

6. The vessel (1) according to claim 5, wherein the rounded shape in the junction region has a maximum inner bend radius (Ri) of 1 times the chord length of the aft foil, and a minimum inner bend radius of 0.5 times the chord length of the aft foil.

7. The vessel (1) according to claim 2, wherein a sweep angle, in plan view, of the leading edge of the aft foil is 15 to 25°.

8. The vessel (1) according to claim 1, wherein at least half the chord of the aft foil is behind a vertical line through the location where the aft portion of the hull leaves the water.

9. The vessel (1) according to claim 2, wherein the connecting members possess a streamlined section shape (17) with respect to the forward direction with a chord length of 0.8 to 1.2 times the chord length of the aft foil.

10. The vessel (1) according to claim 9, wherein the chord length of the connecting members taper from a first chord length at a junction with the hull to a relatively smaller second chord length at the junction with the aft foil, the taper ratio being 0.5 to 0.9.

11. The vessel (1) according to claim 2, wherein the chord length of the aft foil tapers from a first chord length at the mirror plane to a relatively smaller second chord length at a foil tip, the taper ratio being 0.5 to 1.0.

12. The vessel (1) according to claim 1, wherein the forward foil in spanwise direction is symmetrical with respect to the vertical mirror plane, wherein the forward foil has a dihedral angle (∂), such that the distance (D3) of the foil from the hull remains substantially the same along the span of the foil.

13. The vessel (1) according to claim 1, wherein the dihedral angle is 5 to 50°.

14. The vessel (1) according to claim 1, wherein an aspect ratio of the forward foil is at least 4.0.

15. The vessel (1) according to claim 1, wherein an aspect ratio of the aft foil is approximately 4.0 to 7.0.

16. The vessel (1) according to claim 1, wherein the span of both the forward and aft foil is at most 90% of a vessel's hull width at the longitudinal position of the respective foil.

17. The vessel (1) according to claim 1, wherein the forward foil is tilted at a tilting angle (φ) with the leading edge upwards 0 to 10° with respect to the horizontal.

18. The vessel (1) according to claim 2, wherein the connecting members comprise a connecting member foil (17) with a chord (cc), and a leading edge (20) and a trailing edge (21) relative to a forward direction, wherein the connecting member foil has a chord and profile in longitudinal cross section, with a configuration to provide a lifting force (Lc), and wherein the connecting member foil is oriented to provide a continuous, sideways and forward-directed component of the lifting force (Lc12) to amplify the forward-directed component (La12) generated by the aft foil.

19. The vessel (1) according to claim 15, wherein an angle (ψ) between the chord of the connecting member foil, and the vertical mirror plane is between 0 to 10° in the case of the aft foil, and between 0 to −10° in the case of the forward foil.

20. The vessel (1) according to claim 1, wherein the connecting members (13) are each connected to the aft foil by means of a nacelle (25) at a connection point at a spanwise distance from the mirror plane of 30 to 40% of the span of the aft foil.

* * * * *